July 14, 1925.
L. ROSENBERG
CHEMICAL SOLUTION TANK FOR USE IN CLEANING METAL PARTS
Filed Dec. 14, 1923
1,545,979
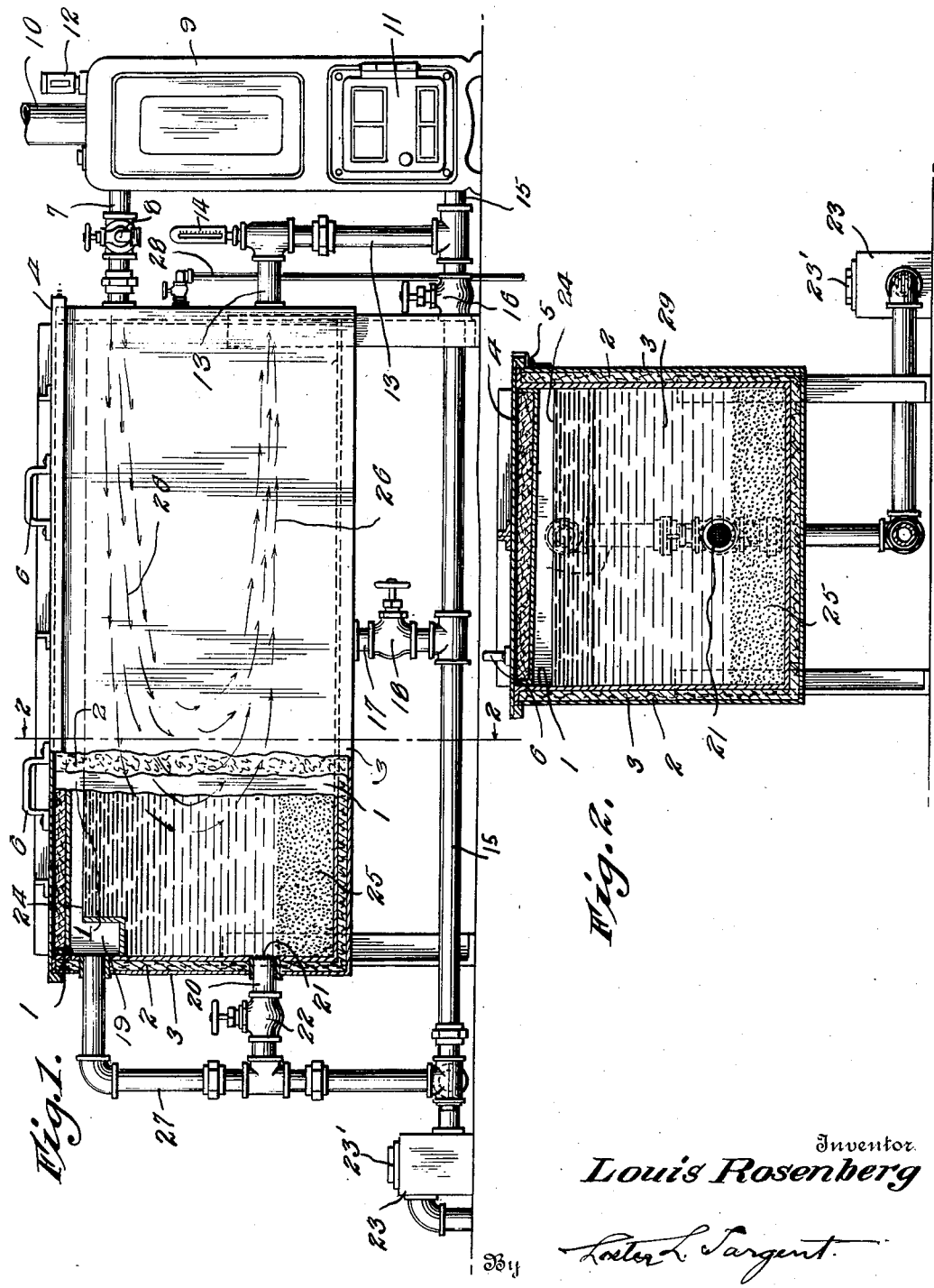
Inventor
*Louis Rosenberg*
By *Lester L. Sargent*
Attorney Patented July 14, 1925.

1,545,979

UNITED STATES PATENT OFFICE.

LOUIS ROSENBERG, OF MILWAUKEE, WISCONSIN, ASSIGNOR TO LAVO COMPANY OF AMERICA, A CORPORATION OF WISCONSIN.

CHEMICAL-SOLUTION TANK FOR USE IN CLEANING METAL PARTS.

Application filed December 14, 1923. Serial No. 680,783.

*To all whom it may concern:*

Be it known that I, LOUIS ROSENBERG, a citizen of the United States, and a resident of Milwaukee, in the county of Milwaukee and State of Wisconsin, have invented a new and useful Chemical-Solution Tank for Use in Cleaning Metal Parts, of which the following is a specification.

The object of my invention is to provide a novel and efficient apparatus for use in cleaning metal parts; and to provide the novel combination and arrangements of parts hereinafter described. I attain these and other objects of my invention by the mechanism illustrated in the accompanying drawings, in which—

Figure 1 is side elevation of my invention, partly in section; and

Fig. 2 is a transverse section on line 2—2 of Fig. 1.

Like numerals designate like parts in each of the several views.

Referring to the accompanying drawings, I provide a tank 1 made of 10 gage boiler plate, over which is an insulation lining of asbestos 2, over which is a galvanized covering 3. I also provide a suitable asbestos lined cover 4, hinged at 5 to the outer shell 3 of the tank, the cover being provided with suitable hand grips 6. I provide a hot solution supply pipe 7 extending from heater 9 to tank 1, as shown in Fig. 1. Pipe 7 is provided with a suitable hose connection 8, used in washing out the tank. Heater 9 is provided with a stack 10 equipped with automatic back draft preventative connected with flue. Heater 9 is also provided with a suitable door 11, and with an automatic heat regulator 12. I provide a cold solution intake 13 to the heater, this intake being provided with a thermometer 14, I also provide a muck washout pipe 15 for the heater. I also provide a suitable valve 16 in pipe 15. I provide a muck draw off pipe 17 opening out of the bottom of tank 1 and into pipe 15, said pipe 17 having a suitable valve 18.

As shown in Fig. 1 of the drawings, I provide a suitable oil dam or grease trap 19 near the upper portion of tank 1 at one end of same, which automatically skims and reclaims all oil recovered from the metal parts placed in the solution tank 1, the normal level or surface of the contents of the tank being designated 24 in Fig. 1.

I provide a conduit 27 opening out of the grease trap 19. I also provide a drain 20 opening out of the lower portion of tank 1 and having a screen 21 at its mouth. Drain 20 is provided with a valve 22. Conduit 27 functions also as a discharge conduit into which drain 20 opens, conduit 27 in turn opening into pipe 15 which in turn discharges into drum trap 23. Trap 23 is provided with a suitable cover 23'. Cold solution intake 13 and drain 20 are both spaced substantially above the bottom of tank 1, so that a muck trap 25 is provided in the bottom of tank 1, as shown in Figs. 1 and 2, below the circulation level of the solution or fluid in the tank used in cleaning the metal parts.

In operation, the tank is filled with water supplied through pipe 28, and the desired chemicals and the metal parts to be cleaned are placed in the tank, the cover 4 of which is removable. The chemical cleaning solution 29 is circulated in the manner indicated by the arrows 26 in Fig. 1, the solution passing through pipes 13 and 15 to the heater 9 and thence back through supply pipe 7 to the tank 1. Oil which is removed from the metal parts by the solution floats to the top and is caught in the grease trap 19 and reclaimed, this oil having a high fuel value. The drain 20, the entrance to which is screened to prevent clogging, being positioned a suitable distance above the bottom of the tank permits of the collection of muck in the bottom of the tank. In draining off the solution 29, it flows through pipe 20 to the drum trap 23' and thence to the sewer. The bottom of the tank being provided with the drain 17 affords means for drawing off the muck to the muck washout pipe 15 and thence to the point of discharge to the sewer. The temperature of the solution is automatically controlled by the automatic heat regulator 12, as indicated in Fig. 1.

What I claim is:—

1. In a chemical solution tank for use in cleaning metal parts, the combination of an elongated tank body, having a removable cover, a heater arranged at one end of the tank, a valve-controlled conduit extending directly from the heater to the upper portion of the tank, a conduit connecting the lower portion of the heater with the lower portion of the tank and at the same end of the tank as the first mentioned conduit to cause a continuous circulation of heated solution through the tank, a valve-controlled discharge conduit in communication with the last mentioned conduit for the discharge of muck from the heater, and a valve-controlled conduit opening out of the bottom of the tank and communicating with the last mentioned muck-discharge conduit for draining the tank when desired.

2. In combination with the apparatus described in claim 1, a grease discharge conduit opening out of the upper portion of the tank, and a chamber forming a grease trap positioned to receive grease from the contents of the tank and to collect and discharge same through said discharge conduit.

3. In combination with the apparatus described in claim 1, a grease discharge conduit opening out of the upper portion of the tank, a chamber forming a grease trap positioned to receive grease from the contents of the tank and to collect and discharge same through said discharge conduit, and a valve-controlled discharge pipe opening out of the lower portion of the tank and spaced from the bottom thereof and in communication with the grease discharge conduit above mentioned, as and for the purposes described.

4. In combination with the apparatus described in claim 1, an independent valve-controlled conduit opening into the upper portion of the tank at a level below that of the grease trap, for the introduction of water into the tank when desired.

LOUIS ROSENBERG.